United States Patent
Sakuma (10) Patent No.: US 11,146,703 B2
(45) Date of Patent: Oct. 12, 2021

(54) IMAGE READING APPARATUS

(71) Applicant: CANON KABUSHIKI KAISHA, Tokyo (JP)

(72) Inventor: Tomofumi Sakuma, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/029,760

(22) Filed: Sep. 23, 2020

(65) Prior Publication Data

US 2021/0144269 A1 May 13, 2021

(30) Foreign Application Priority Data

Nov. 13, 2019 (JP) .............................. JP2019-205518

(51) Int. Cl.
 *H04N 1/04* (2006.01)
 *H04N 1/00* (2006.01)
(52) U.S. Cl.
 CPC ..... *H04N 1/00559* (2013.01); *H04N 1/00557* (2013.01); *H04N 1/00798* (2013.01)
(58) Field of Classification Search
 None
 See application file for complete search history.

(56) References Cited

U.S. PATENT DOCUMENTS

| | | | | |
|---|---|---|---|---|
| 6,512,603 B2* | 1/2003 | Saito | .................... | H04N 1/0315 |
| | | | | 358/509 |
| 9,225,867 B2* | 12/2015 | Togashi | ............... | H04N 1/1017 |
| 10,477,051 B2 | 11/2019 | Sakuma | ............. | H04N 1/00801 |
| 2018/0117937 A1* | 5/2018 | Wang | .................... | B41J 19/005 |
| 2018/0227455 A1* | 8/2018 | Tatsumi | ............... | H04N 1/1026 |
| 2020/0329172 A1 | 10/2020 | Sakuma | ............... | H04N 1/1017 |
| 2020/0382667 A1* | 12/2020 | Suto | ................... | H04N 1/00525 |

FOREIGN PATENT DOCUMENTS

JP 2011-030032 2/2011

\* cited by examiner

*Primary Examiner* — Cheukfan Lee
(74) *Attorney, Agent, or Firm* — Venable LLP (57) ABSTRACT

An image reading apparatus in which tilt is suppressed when inserting a flexible flat cable into a connector mounted on a circuit board on which an image sensor is also mounted. The flexible flat cable transmits an image signal output from the image sensor to a controller, and is inserted into the connector for electrically connecting the image sensor with the controller. The circuit board is fixed by adhesive to a carriage. The connector is mounted at an end portion of the circuit board in a first direction which is a main scanning direction. A thickness direction of the circuit board is a second direction, and a third direction is orthogonal to the first and second directions. The flexible flat cable is inserted into the connector along the third direction, and the adhesive is filled between a surface at the end portion of the circuit board and an opposing wall portion of the carriage, wherein the surface extends in the first and second directions.

8 Claims, 6 Drawing Sheets

IMAGE READING APPARATUS

BACKGROUND OF THE INVENTION

Field of the Invention

The present invention relates to an image reading apparatus for reading an image on a document.

Description of the Related Art

Conventionally, a reader that places a document on a document tray glass and reads the document with an image reading unit, and an ADF that automatically conveys a document placed on a document tray and reads the document with an image reading unit are known as an image reading apparatus. The image reading unit mounted on these apparatuses includes a control circuit board on which an image sensor for outputting image data of a document as an electric signal and a connector are mounted.

The electric signal output from the image sensor of the image reading unit is transmitted via a cable to another control circuit board on which electronic components for image processing are mounted, and where the image processing is performed. Japanese Patent Application Laid-Open No. 2011-30032 describes the configuration in which a cable is inserted into a connector mounted on a control circuit board of an image reading unit in a direction parallel to a mounting surface of the control circuit board.

The control circuit board is fixed to the housing of the image reading unit with adhesive in many cases since the control circuit board is fixed after the position of the image sensor is fine-tuned. In this case, when the cable is inserted into the connector mounted on the control circuit board along the direction parallel to the mounting surface of the control circuit board as in the configuration of Japanese Patent Application Laid-Open No. 2011-30032, the control circuit board is tilted due to a force transmitted to the control circuit board during the insertion of the cable into the connector, causing the image sensor mounted on the control circuit board to be displaced, resulting in deterioration of image reading accuracy.

SUMMARY OF THE INVENTION

An representative configuration of the present invention is an image reading apparatus for reading an image on a document, the image reading apparatus comprising:

a light source configured to irradiate the document with light along a main scanning direction;

an image sensor configured to receive light reflected from the document irradiated by the light source;

a circuit board on which the image sensor is mounted;

a flexible flat cable through which an image signal output from the image sensor is transmitted to a controller;

a connector mounted on the circuit board, the flexible flat cable being inserted into the connector for electrically connecting the image sensor with the controller;

a carriage configured to support the circuit board; and adhesive that is filled for fixing the circuit board on the carriage, wherein assuming that the main scanning direction is a first direction, that a thickness direction of the circuit board is a second direction, and that a direction orthogonal to the first direction and the second direction is a third direction, the connector is mounted on a side of an end portion of the circuit board in the first direction, wherein the flexible flat cable is inserted into the connector along the third direction, and wherein the adhesive is filled between a surface on the side of the end portion of the circuit board in the first direction and a wall portion of the carriage, the surface extending in the first direction and the second direction, the wall portion being opposed to the surface.

According to the present invention, in an image reading apparatus in which the circuit board is fixed to a carriage of the image reading apparatus with adhesive, it is possible to suppress the circuit board from being tilted when the cable is inserted into the connector mounted on the circuit board.

Further features of the present invention will become apparent from the following description of exemplary embodiments with reference to the attached drawings.

DESCRIPTION OF THE EMBODIMENTS

<Image Forming Apparatus>

Hereinafter, the overall configuration of the image forming apparatus A including the image reading apparatus will be described together with the image forming operation with reference to the drawings. The dimensions, materials, shapes, and their relative arrangements of the components described below are not intended to limit the scope of the present invention only to them unless otherwise specified.

Figure 1:
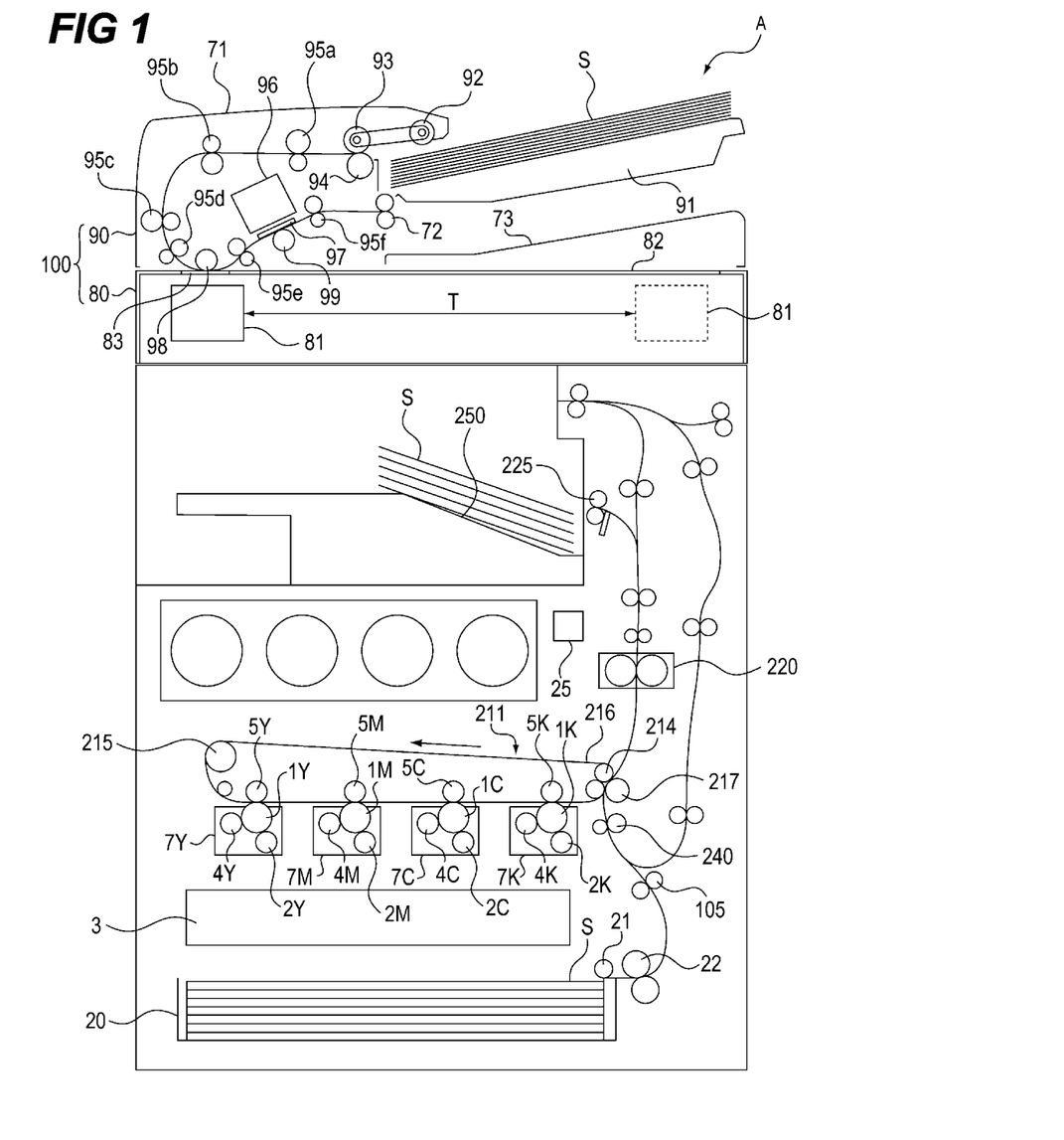
FIG. 1 is a schematic cross-sectional view of an image forming apparatus.

FIG. 1 is a schematic sectional view of the image forming apparatus A. As shown in FIG. 1, the image forming apparatus A is provided with the image forming portion 211 that forms an image on the sheet S. The image forming portion 211 includes the process cartridges 7 (7Y, 7M, 7C, and 7K), the laser scanner unit 3, the primary transfer rollers 5 (5Y, 5M, 5C, and 5K), the intermediate transfer belt 216, the secondary transfer roller 217, the secondary transfer roller 217, the secondary transfer counter roller 214, the drive roller 215 and so on.

The process cartridges 7 are configured to be detachably attachable to the image forming apparatus A. The process cartridges 7 for respective colors include the photosensitive drums 1 (1Y, 1M, 1C, and 1K), the charging rollers 2 (2Y, 2M, 2C, and 2K), and the developing rollers 4 (4Y, 4M, 4C, and 4K), respectively.

The image reading apparatus 100 that reads an image of a document is provided at the upper portion of the image forming apparatus A. The image reading apparatus 100 includes the reader 80 and the ADF 90 (Automatic Document Feeder). The reader 80 reads the image of a document placed on the document table glass 82. The ADF 90 automatically conveys a document placed on the document tray 91 to read the image. The document is assumed to include a sheet such as plain paper or an envelope, a plastic film such as a sheet for an overhead projector, cloth. The detailed configuration of the image reading apparatus 100 will be described later.

The controller circuit board 25 (second control circuit board) is attached to the frame body on the back side of the image forming apparatus A. The controller circuit board 25 is an electronic circuit board for performing various controls such as image processing, communication with an external device, and control of a power supply circuit board (not shown). In addition, on the controller circuit board 25, electronic components (not shown) are mounted, which perform image processing for converting an image of a document read by the image reading apparatus 100 into image data, and image processing for generating image data based on an image input from an external device. The image processing includes processing for converting an RGB format into a YMCK format, density correction, magnification correction, and color deviation correction processing.

Further, on the front side of the image forming apparatus A, an operation unit (not shown) is provided for displaying information and for performing settings related to image formation by a user's operation. In the present embodiment, the front side of the image forming apparatus A is the side near which a user normally stands when the user operates the operation portion. The back side of the image forming apparatus A is the side opposite to the front side of the image forming apparatus A. The same applies to the front side and the back side of the image reading apparatus 100.

Next, the image forming operation of the image forming apparatus A will be described. When forming an image, an image forming job signal is first input to the CPU (not shown) mounted on the controller circuit board 25. As a result, the sheet S stored in the sheet cassette 20 is conveyed to the registration roller 240 by the pickup roller 21, the feeding roller 22, and the conveying roller 105. Thereafter, the sheet S is sent at a predetermined timing by the registration roller 240 to the secondary transfer portion formed by the secondary transfer roller 217 and the secondary transfer counter roller 214.

On the other hand, in the image forming portion 211, the surface of the photosensitive drum 1Y is first charged by the charging roller 2Y. Thereafter, the laser scanner unit 3 irradiates the surface of the photosensitive drum 1Y with laser light according to the image data of the document read by the image reading apparatus 100, and forms an electrostatic latent image on the surface of the photosensitive drum 1Y. Then, yellow toner is attached to the electrostatic latent image formed on the surface of the photosensitive drum 1Y by the developing roller 4Y, and a yellow toner image is formed on the surface of the photosensitive drum 1Y. The toner image formed on the surface of the photosensitive drum 1Y is primarily transferred to the intermediate transfer belt 216 by applying a bias to the primary transfer roller 5Y.

By the same process, magenta, cyan, and black toner images are also formed on the photosensitive drums 1M, 1C, and 1K, respectively. Then, by applying a bias to the primary transfer rollers 5M, 5C, and 5K, these toner images are transferred superposedly on the yellow toner image on the intermediate transfer belt 216. As a result, a full-color image is formed on the surface of the intermediate transfer belt 216.

Thereafter, the full-color toner image is sent to the secondary transfer portion by the intermediate transfer belt 216 that is rotated by the driving force transmitted from the driving roller 215. Then, a bias is applied to the secondary transfer roller 217 at the secondary transfer portion, so that the full-color toner image on the intermediate transfer belt 216 is transferred to the sheet S.

Next, the sheet S to which the toner image has been transferred is conveyed to the fixing device 220 where the sheet S is subjected to a fixing process of heating and pressing. As a result, the toner image on the sheet S is fixed on the sheet S. Thereafter, the sheet S on which the image is fixed is discharged to the discharge tray 250 by the discharge roller 225.

<Image Reading Apparatus>

Next, the configuration of the image reading apparatus 100 will be described.

As shown in FIG. 1, the reader 80 includes the image reading unit 81 that optically reads the image data of the sheet S that is a document and converts the image data into an electric signal, the document table glass 82, and the platen glass 83. The image reading unit 81 is moved by a driving unit (not shown) in the direction of the arrow T in the space below the document table glass 82 and the platen glass 83. A CPU (not shown) mounted on the controller circuit board 25 recognizes the position of the image reading unit 81 from the number of rotation pulses of a position sensor (not shown) and a motor (not shown).

When the image data of the sheet S should be read by the reader 80, a user first places the sheet S on the document table glass 82. Thereafter, the image reading unit 81 irradiates the sheet S with light while moving in the direction of the arrow T, and an image sensor device (not shown) receives the reflected light, and the image sensor outputs an electric signal corresponding to the image data of the sheet S. In this way, the image data of the sheet S is read. The ADF 90 is rotatably supported on the reader 80. After rotating the ADF 90 upward to open it, a user can access the document table glass 82.

The ADF 90 includes the document tray 91 on which the sheets S, which are documents, are stacked, the pickup roller 92 for picking up the sheets S stacked on the document tray 91, and the feeding roller 93 for feeding the sheets S picked up by the pickup roller 92. The ADF 90 also includes the conveying rollers 95 (95a to 95f) that convey the sheets S fed by the feeding roller 93. The pickup roller 92 is configured to be able to be lifted and lowered by a moving mechanism (not shown). When the pickup roller 92 should pick up the sheet S, the pickup roller 92 is lowered and comes into contact with one of the sheets S stacked on the document tray 91.

Further, the ADF 90 includes the separation roller 94 that presses the feeding roller 93 to form a nip portion where the separation roller 94 separates one by one the sheets S fed to the feeding roller 93. A torque limiter (not shown) is attached to the rotation shaft of the separation roller 94.

The ADF 90 further includes the image reading unit 96 that optically reads the image of the sheet S that is a document and converts the image data into an electric signal. The detailed configuration of the image reading unit 96 will be described later. The platen glass 97 is provided at a position facing the image reading unit 96. Further, in the ADF 90, the platen rollers 98 and 99 are provided at positions facing the platen glasses 83 and 97, respectively. The platen rollers 98 and 99 suppress from floating the sheet S on which the image is being read while the sheet is coming into contact with the platen glasses 83 and 97.

The ADF 90 further includes the opening/closing cover 71 that supports the pickup roller 92 and the feeding roller 93. The opening/closing cover 71 is rotatably supported on a support shaft (not shown) of the apparatus main body of the ADF 90. The opening/closing cover 71 can be rotated between an open position at which the opening/closing cover 71 is open from the apparatus main body of the ADF 90 and a closed position at which the opening/closing cover 71 is closed to the apparatus main body of the ADF 90. The opening/closing cover 71 forms a conveying path for the sheet S when the opening/closing cover 71 is located at the closed position, and the conveying path is opened when the opening/closing cover 71 is located at the open position.

When the image of the sheet S is read by the ADF 90, the sheets S stacked on the document tray 91 are first conveyed to the first reading position by the pickup roller 92, the feeding roller 93, and the conveying rollers 95a to 95d while being separated one by one by the separation roller 94. The first reading position is located between the platen glass 83 and the platen roller 98. Next, the image of the first surface of the sheet S is read by the image reading unit 81 at the first reading position. The image data read by the image reading unit 81 is transmitted to the controller circuit board 25, and the above-mentioned image processing is performed.

Next, the sheet S is conveyed by the conveying rollers 95e to a second reading position located between the platen glass 97 and the platen roller 99. When an instruction is provided from a user that the image on the second surface of the sheet S should be read, the image reading unit 96 reads the image on the second surface of the sheet S at the second reading position. The image data read by the image reading unit 96 is transmitted to the controller circuit board 25, and the above-mentioned image processing is performed. Thereafter, the sheet S is conveyed by the conveying rollers 95f and discharged onto the discharge tray 73 by the discharge rollers 72.

<Image Reading Unit>

Next, the configuration of the image reading unit 96 will be described.

Figure 2:
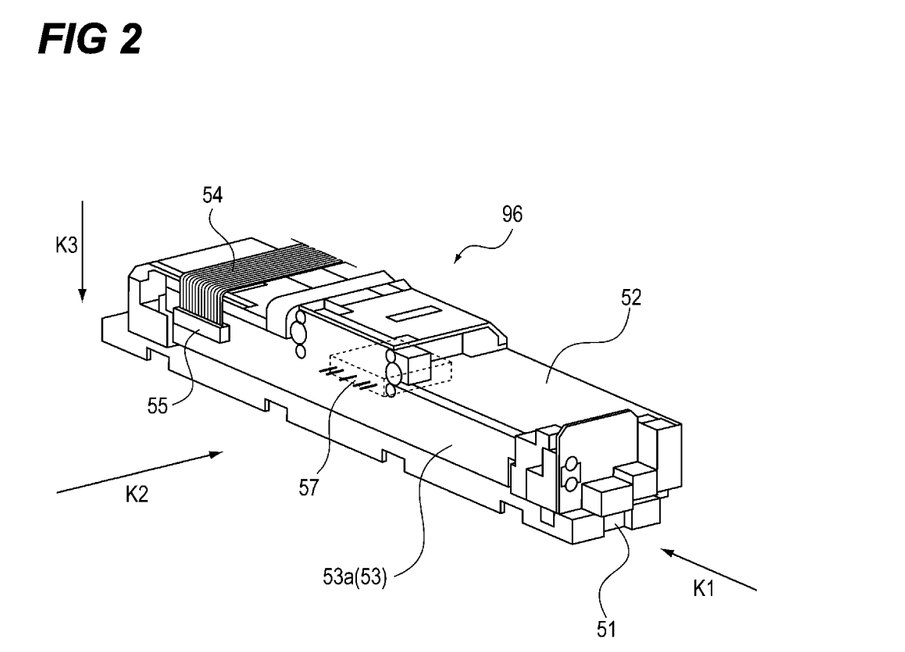
FIG. 2 is a perspective view of an image reading unit.
Figure 3:
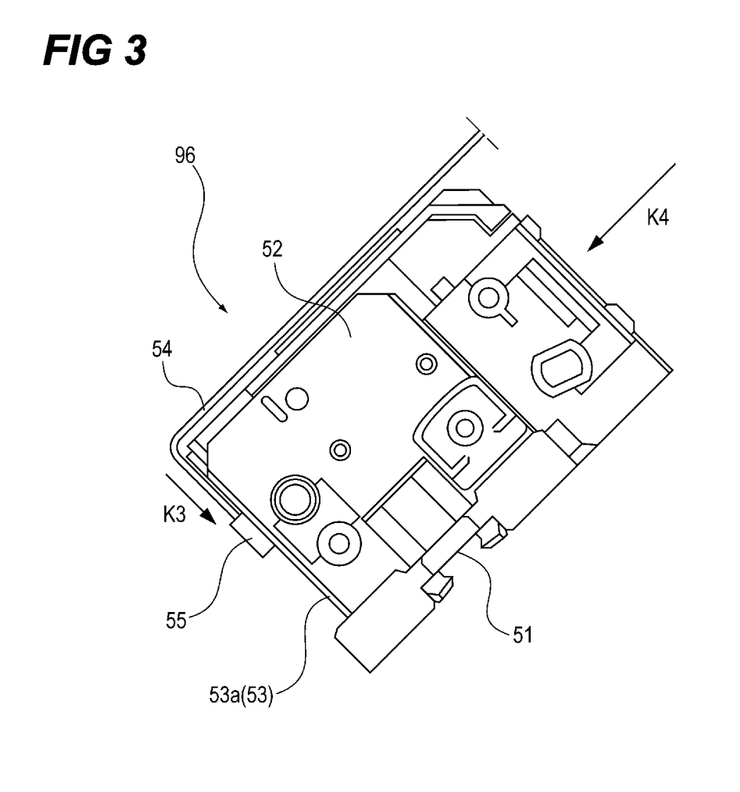
FIG. 3 is a plan view of the image reading unit.
Figure 4:
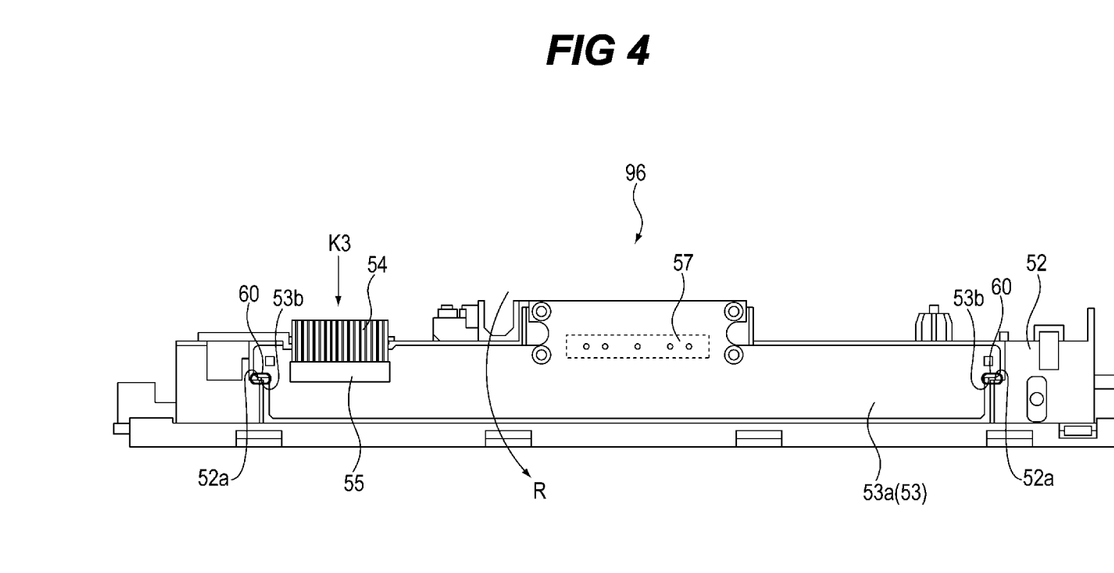
FIG. 4 is a plan view of the image reading unit.

FIG. 2 is a perspective view of the image reading unit 96. FIG. 3 is a diagram of the image reading unit 96 viewed in the direction of the arrow K1 shown in FIG. 2. FIG. 4 is a diagram of the image reading unit 96 viewed in the direction of arrow K2 shown in FIG. 2. The direction of the arrow K1 (first direction) is the longitudinal direction of the control circuit board 53, and is also the direction in which the image reading unit 96 is viewed from the front of the image reading apparatus 100 when the image reading unit 96 is incorporated in the ADF 90. The direction of the arrow K1 is also the direction of the main scanning when the image of the document is read. The direction of the arrow K2 (second direction) is the thickness direction of the control circuit board 53, and is the direction orthogonal to the direction of the arrow K1. The direction of the arrow K3 (third direction) is the width direction of the control circuit board 53, and is the direction orthogonal to the direction of the arrow K1 and the direction of the arrow K2.

As shown in FIGS. 2 to 4, the image reading unit 96 includes the carriage 52, the control circuit board 53 (first control circuit board), the lighting unit 51 including a plurality of LEDs, and a mirror (not shown). The carriage 52 is a housing made from polycarbonate for holding the control circuit board 53, the lighting unit 51, the mirror and the like. The image sensor 57 and the connector 55 are mounted on the mounting surface 53a of the control circuit board 53.

Although a CCD (Charge Coupled Device) sensor is used as the image sensor in the present embodiment, another image sensor such as a CIS (Contact Image Sensor) device may be used. The image sensor 57 is mounted on the surface of the control circuit board 53 opposite to the surface on which the connector 55 is mounted. As the image sensor 57 receives the condensed light via the mirror, the image sensor 57 is mounted at the central portion of the control circuit board 53 in the longitudinal direction (K1 direction). The connector 55 is mounted closer to an end portion of the control circuit board 53 than the image sensor 57.

The control circuit board 53 is fixed to the carriage 52 after the position of the image sensor 57 is fine-tuned three-dimensionally in the K1, K2, and K3 directions using a jig. That is, after the position of the control circuit board 53 is adjusted according to a plurality of axes, the control circuit board 53 is fixed to the carriage 52 with adhesive 60 that is ultraviolet curable adhesive (UV adhesive). The adhesive 60 is applied to the periphery of the image sensor 57 and the end portions of the control circuit board 53 in the direction K1. However, the adhesive 60 in the periphery of the image sensor 57 is not shown as it cannot be seen in the drawing. Further, the adhesive 60 is not applied to the surface of the carriage extending in the directions K1 and K3, which cannot be recognized by the drawings.

The connector 55 is fixed to the mounting surface 53a of the control circuit board 53 by soldering. The material of the adhesive applied to the periphery of the image sensor 57 may be different from that of the adhesive applied to the end portions of the control circuit board 53 in the direction of the arrow K1. For example, the material of the adhesive applied to the periphery of the image sensor 57 may be harder than that of the adhesive applied to the end portions of the control circuit board 53 in the direction of the arrow K1. For example, as the adhesive applied to the periphery of the image sensor 57, TB3038C (a product of ThreeBond) may be used, and as the adhesive applied to the end portions of the control circuit board 53 in the direction of the arrow K1, TB3017F (a product of ThreeBond) may be used.

The image reading unit 96 reads the image of a document by irradiating the document with light by the lighting unit 51 with LEDs along the direction of the arrow K1 which is the main scanning direction, by receiving the reflected light with the image sensor 57, and by outputting an electric signal corresponding to the image data of the document. The reflected light from the document is guided to the image sensor 57 by the mirror (not shown). The electric signal output from the image sensor 57 is transmitted to the controller circuit board 25 via the cable 54 that is a flexible flat cable. Thereafter, the above-described image processing is performed by the electronic components (not shown) mounted on the controller circuit board 25.

The cable 54 is inserted into the connector 55 mounted on the control circuit board 53 along the direction parallel to the mounting surface 53a of the control circuit board 53. More specifically, the cable 54 is inserted along the direction of the arrow K3. In the present embodiment, even if the insertion direction of the cable 54 deviates within the tolerance range with respect to the K3 direction, it is assumed that the cable 54 is inserted along the K3 direction.

A connector (not shown) corresponding to the connector 55 is attached to one end of the cable 54. By inserting the connector of the cable 54 into the connector 55 mounted on the control circuit board 53, the one end of the cable 54 is electrically connected to the control circuit board 53.

The other end of the cable 54 is electrically connected to the controller circuit board 25. That is, the control circuit board 53 (imaging sensor 57) and the controller circuit board 25 are electrically connected by the cable 54 one end of which is connected to the control circuit board 53 and the other end of which is connected to the controller circuit board 25. By both of the circuit boards being connected to each other, not only transmission of the image data read by the image reading unit 96, but also the power supply to the control circuit board 53 is performed.

The connector 55 is arranged closer to the back side of the image reading unit 96 than the image sensor 57. This is because the controller circuit board 25 is attached to the frame body on the back side of the image forming apparatus A as described above. That is, by arranging the connector 55 near the back side of the image reading apparatus 100, the connection position of the cable 54 becomes near the back side, so that it becomes easier to wire the cable 54.

An operator who performs the assemblage inserts the cable 54 into the connector 55 from the direction of the arrow K4 shown in FIG. 3. In this case, it may be not possible for an assembling operator to confirm whether the cable 54 has been completely inserted or is in the middle of being inserted as it is difficult to visually recognize the position of the connector 55 due to an exterior cover (not shown) of the ADF 90. Therefore, an assembling operator applies a large force (for example, 5 kgf) to the cable 54 in the insertion direction in order to ensure the insertion of the cable 54 into the connector 55. This force is also transmitted to the control circuit board 53.

On the other hand, as described above, the control circuit board 53 is fixed to the carriage 52 not by strong fixing such as screw fixing, but by the adhesive 60. As a result, when the cable 54 is inserted into the connector 55, the control circuit board 53 may be tilted as the adhesive portion between the control circuit board 53 and the carriage 52 shifts due to the force applied to the control circuit board 53. Namely, when the cable 54 is inserted into the connector 55, the control circuit board 53 is likely to rotate to tilt in the direction of the arrow R shown in FIG. 4 around the fixing portion by the adhesive 60 in the periphery of the image sensor 57 as a large force is applied to the periphery of the connector 55 on the control circuit board 53. When the control circuit board 53 is tilted in this way, the position of the image sensor 57 deviates from the adjusted position so that the image reading precision of the image reading unit 96 deteriorates.

In order to suppress the control circuit board 53 from being tilted, the adhesive 60 is filled in the space between the carriage and the control circuit board 53, which are opposed to each other in the direction (direction of the arrow K3) in which the cable 54 is inserted into the connector 55. Specifically, as shown in FIG. 4, the adhesive 60 is applied to the portion to be bonded 53b on the control circuit board 53, which is opposed to the carriage 52 in the direction of the arrow K3, and to the portion to be bonded 52a (wall portion) on the carriage 52, which is opposed to the control circuit board 53 in the direction of the arrow K3. Namely, the portion to be bonded 53b of the control circuit board 53 and the portion to be bonded 52a of the carriage 52 are connected by the adhesive 60. In this case, the portion to be bonded 52a is an example of a surface of the carriage 52, extending in the directions K1 and K2. The portion to be bonded 53b is an example of a surface of the circuit board 53, extending in the directions K1 and K2. The portion to be bonded 52a and the portion to be bonded 53b are opposed to each other in the direction K3 shown in FIG. 2.

With this configuration, even when a force in the direction of the arrow K3 is applied to the control board 53 during the insertion of the cable 54 into the connector 55, the movement of the control circuit board 53 is restricted by the adhesive 60 and the carriage 52. As the control circuit board 53 is suppressed from being tilted and the position of the image sensor 57 mounted on the control circuit board 53 is suppressed from being shifted, thereby suppressing the image reading accuracy by the image reading unit 96 from deteriorating.

Although the configuration in which an ultraviolet curable adhesive is used as the adhesive 60 has been described in this embodiment, the present invention is not limited to this configuration. Namely, when the configuration is adopted in which as the adhesive 60, another type of adhesive is used such as adhesive whose phase changes from liquid to solid as time elapses, the above-described effect may be obtained.

Figure 5:
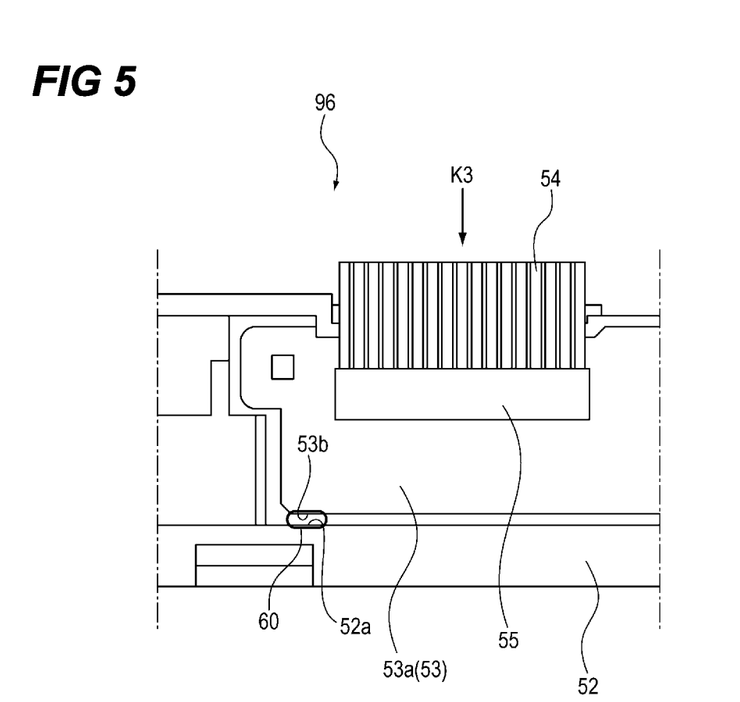
FIG. 5 is a view showing another configuration of the image reading unit.

Although the configuration in which the adhesive 60 is filled at the position shown in FIG. 4 has been described in this embodiment, the present invention is not limited to this configuration. Namely, as long as the configuration is adopted in which the adhesive 60 is filled in the space between the control circuit board 53 and the carriage 52, which are opposed to each other in the insertion direction of the cable 54 into the connector 55, the same effect described above can be obtained. For example, as shown in FIG. 5, the configuration may be adopted in which the adhesive 60 is filled in the space between the lower end portion of the control circuit board 53 and the carriage 52, which are opposed to each other.

Figure 6:
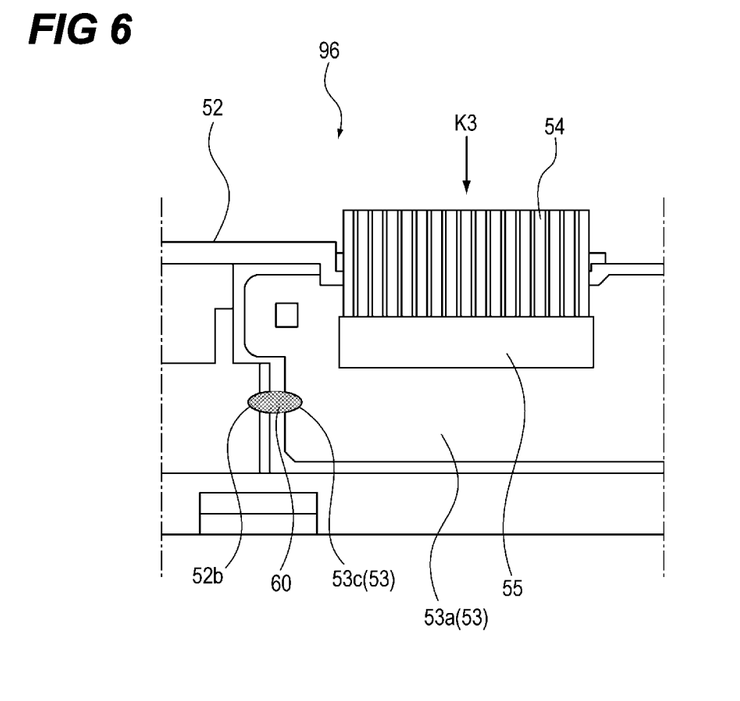
FIG. 6 is a view showing another configuration of the image reading unit.

Further, as shown in FIG. 6, the configuration may be adopted in which the semispherical concave portion 52b is formed on the carriage 52, the semispherical concave portion 53c is formed on the control circuit board 53 at the position corresponding to that of the concave portion 52b, and the adhesive 60 is filled in the concave portion 52b and the concave portion 53c. With this configuration, the control circuit board 53 is more effectively suppressed from being tilted when the cable 54 is inserted into the connector 55 than the configuration in which the adhesive 60 is filled between the space between the surface without the concave portion 53c of the control circuit board 53 and the surface without the concave portion 52b of the carriage 52.

Although the configuration has been described in which the controller circuit board 25 on which electronic components for performing the processing of an image data read by the image reading unit 96 are mounted is provided on the apparatus main body side of the image forming apparatus A in the present embodiment, the present invention is not limited to this configuration. Namely, when the configuration may be adopted in which the controller circuit board 25 is provided on the side of the image reading apparatus 100, the same effect described above can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-205518 filed Nov. 13, 2019, which is hereby incorporated by reference herein in its entirety.

What is claimed is:

1. An image reading apparatus for reading an image on a document, the image reading apparatus comprising:
   a light source configured to irradiate the document with light along a main scanning direction;
   an image sensor configured to receive light reflected from the document irradiated by the light source;
   a circuit board on which the image sensor is mounted;
   a flexible flat cable through which an image signal output from the image sensor is transmitted to a controller;
   a connector mounted on the circuit board, the flexible flat cable being inserted into the connector for electrically connecting the image sensor with the controller;

a carriage configured to support the circuit board; and adhesive that is filled for fixing the circuit board on the carriage, wherein assuming that the main scanning direction is a first direction, that a thickness direction of the circuit board is a second direction, and that a direction orthogonal to the first direction and the second direction is a third direction, the connector is mounted on a side of an end portion of the circuit board in the first direction, wherein the flexible flat cable is inserted into the connector along the third direction, and wherein the adhesive is filled between a surface on the side of the end portion of the circuit board in the first direction and a wall portion of the carriage, the surface extending in the first direction and the second direction, the wall portion being opposed to the surface.

2. The image reading apparatus, according to claim 1, wherein the adhesive is of an ultraviolet curable type.

3. The image reading apparatus, according to claim 1, wherein the image sensor is mounted on an opposite surface of the circuit board to a surface on which the connector is mounted.

4. The image reading apparatus, according to claim 1, wherein the image sensor is mounted at a central portion of the circuit board in the first direction.

5. The image reading apparatus, according to claim 1, wherein the connector is fixed on the circuit board by soldering.

6. The image reading apparatus, according to claim 1, wherein the adhesive is filled at a position closer to the end portion of the circuit board in the first direction than that of the connector.

7. The image reading apparatus, according to claim 1, wherein the adhesive is not applied to a wall of the carriage, the wall extending in the first direction and the third direction.

8. The image reading apparatus, according to claim 1, wherein the image sensor receives the light reflected from the document via a mirror fixed on the carriage.

* * * * *